United States Patent [19]
Takahashi et al.
[11] Patent Number: 4,911,130
[45] Date of Patent: Mar. 27, 1990

[54] AIR-FUEL RATIO CONTROLLER OF INTERNAL COMBUSTION ENGINE

[75] Inventors: Toshihisa Takahashi; Masanobu Uchinami, both of Himeji; Ryoji Nishiyama, Amagasaki; Seiya Kominami; Shinichi Nishida, both of Himeji, all of Japan

[73] Assignee: Mitsubishi Denki Kabushiki Kaisha, Tokyo, Japan

[21] Appl. No.: 322,339

[22] Filed: Mar. 10, 1989

[30] Foreign Application Priority Data

Mar. 10, 1988 [JP] Japan ................................ 63-56782

[51] Int. Cl.[4] ...................... F02D 41/14; G01N 27/46
[52] U.S. Cl. .................................... 123/489; 204/425
[58] Field of Search ................ 123/440, 489; 204/406, 204/425, 426

[56] References Cited

U.S. PATENT DOCUMENTS

| | | | |
|---|---|---|---|
| 4,538,575 | 9/1985 | Chujo et al. | 123/440 |
| 4,611,562 | 9/1986 | Nakano et al. | 123/440 |
| 4,651,402 | 12/1985 | Nakano et al. | 123/440 X |
| 4,694,809 | 9/1987 | Nakano et al. | 123/489 |
| 4,721,084 | 1/1988 | Kawanabe et al. | 123/440 |
| 4,765,298 | 8/1988 | Kojima et al. | 123/440 |

FOREIGN PATENT DOCUMENTS 72561 5/1985 Japan .

*Primary Examiner*—Tony M. Argenbright
*Attorney, Agent, or Firm*—Sughrue, Mion, Zinn, Macpeak & Seas

[57] ABSTRACT

An air-fuel (A/F) controller of an internal combustion engine, which computes an average value of a plurality of duty ratios of the voltage supplied to the heater according to the engine speed and the engine load periodically detected during a period from a predetermined moment up to the present, and fixes said average value as the present duty ratio of the voltage to be supplied to the heater, since the A/F ratio sensor is heated not only by the heater but also by exhaust gas. The A/F ratio controller smoothes the variation of voltage to be supplied to the heater by applying the computed average value as the present duty ratio of the supply voltage which is to be supplied to the heater. Accordingly, even when the driving condition is in high-speed, variation of the temperature borne by the heater is mild and smooth, and thus, the temperature of the oxygen-concentration detecting element does not rise suddenly. Furthermore, the A/F ratio controller corrects the above-mentioned present duty ratio of the voltage to be supplied to the heater according to the supply voltage to be supplied to the heater.

10 Claims, 6 Drawing Sheets

AIR-FUEL RATIO CONTROLLER OF INTERNAL COMBUSTION ENGINE

BACKGROUND OF THE INVENTION

1. Field of the Invention

The present invention relates to a device for controlling air-fuel (A/F) ratio of an internal combustion engine, more particularly, to an A/F ratio controller which corrects voltage to be supplied to the heater for heating the A/F ratio sensor according to the engine-driving condition.

2. Description of the Prior Art

When operating an internal combustion engine, in particular, one which drives a vehicle engine provided with a ternary catalyzer for purifying exhaust gas, the A/F ratio of exhaust gas must be strictly held at the theoretical A/F ratio. Today, there is such a specific A/F ratio controller available for use, which executes feedback control of A/F ratio by means of an A/F ratio sensor which sharply varies the level of output by applying the theoretical A/F ratio in order that the actual A/F ratio can approximate the theorectical A/F ratio.

Nevertheless, since the A/F ratio sensor of the abovecited A/F ratio controller can only measure the theoretical A/F ratio, actually, this controller cannot execute feedback control of A/F ratio covering an extensive range. To compensate for such disadvantage, recently, a preceding art presents a system for controlling the A/F ratio using an A/F ratio sensor which is capable of measuring not only the theoretical A/F ratio, but can also continuously measure the A/F ratio from the rich to the lean degree according to the volume of specific component like oxygen present in the exhaust gas. This A/F ratio sensor incorporates an oxygenconcentration detecting element composed of ion-conductive solid electrolyte and a heater which activates the element. Unless held at the predetermined temperature by means of a heater, the oxygen-concentration detecting element of the A/F ratio sensor is it cannot function correctly by itself. FIG. 1 is the graphical chart designating the relationship between the temperature of the oxygen-concentration detecting element and the deviation of signals outputted from the above-cited A/F ratio sensor ($\Delta A/F$). As is clear from this chart, independent of differential values of temperature borne by the oxygen-concentration detecting element against the predetermined reference level, deviation is generated by signals outputted from the A/F ratio sensor.

On the other hand, depending on the engine driving condition, the temperature of exhaust gas varies, and thus, the temperature of the A/F ratio sensor set to the exhaust-gas tube also varies. To compensate for this conventionally, the caloric value of the heater is controlled according to the load and the number of the rotational of the engine. Nevertheless, although the temperature of exhaust gas instantly responds to the engine driving condition, the temperature of the A/F ratio sensor does not instantly respond to the exhaust gas temperature. Conventional A/F ratio sensors cannot maintain the temperature of the oxygen-concentration detecting device at the predetermined value since they merely apply the variation of the load and the number of the rotation of the engine to the control of the heater. Consequently, error is easily generated in the signal outputted from the A/F ratio sensor, and as a result, the A/F ratio controller cannot precisely control the A/F ratio.

SUMMARY OF THE INVENTION

The invention has been achieved for fully solving the problems mentioned above.

The primary object of the invention is to provide a novel A/F ratio controller which can constantly maintain the temperature of the oxygen-concentration detecting element of the A/F ratio sensor at a predetermined value and precisely control the A/F ratio.

The second object of the invention is to constantly maintain the temperature of the oxygen-concentration detecting element at the predetermined value by applying the actual duty ratio of the heater for heating the oxygen-concentration detecting element of the A/F ratio sensor, where the actual duty ratio of the heater is substantially composed of the average value of the duty ratios of voltage to be supplied to the heater, computed in relation to the engine speed and the load of the engine, which are periodically detected during a period from a moment before the predetermined period of time to the present.

The third object of the invention is to correct the duty ratio of the voltage to be supplied to the heater in accordance with the voltage outputted from the power-supply source of the heater.

The above and further objects and features of the invention will more fully be apparent from the following detailed description with accompanying drawings.

DESCRIPTION OF THE PREFERRED EMBODIMENTS

Figure 1:
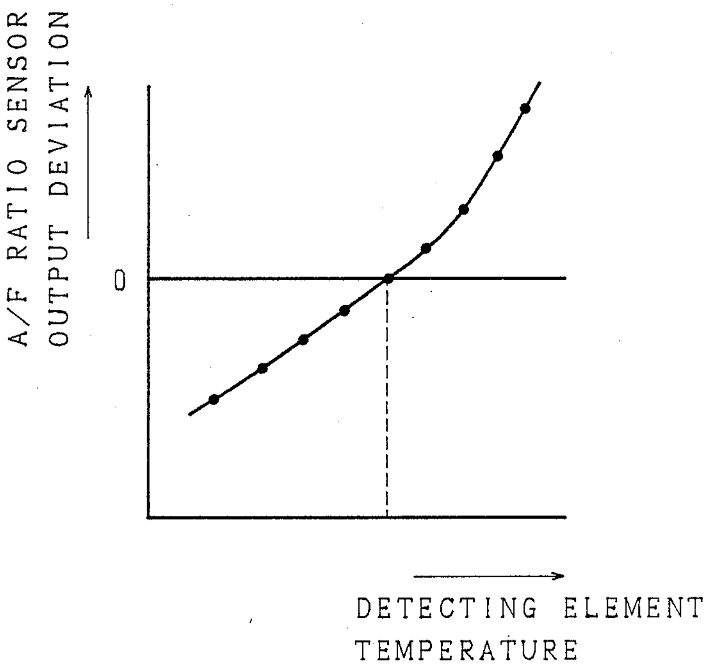
FIG. 1 is a graphical chart designating the relationship between the temperature of the oxygen-concentration detecting element and the deviation of signals outputted from the A/F ratio sensor of a conventional A/F ratio sensor.
Figure 2:
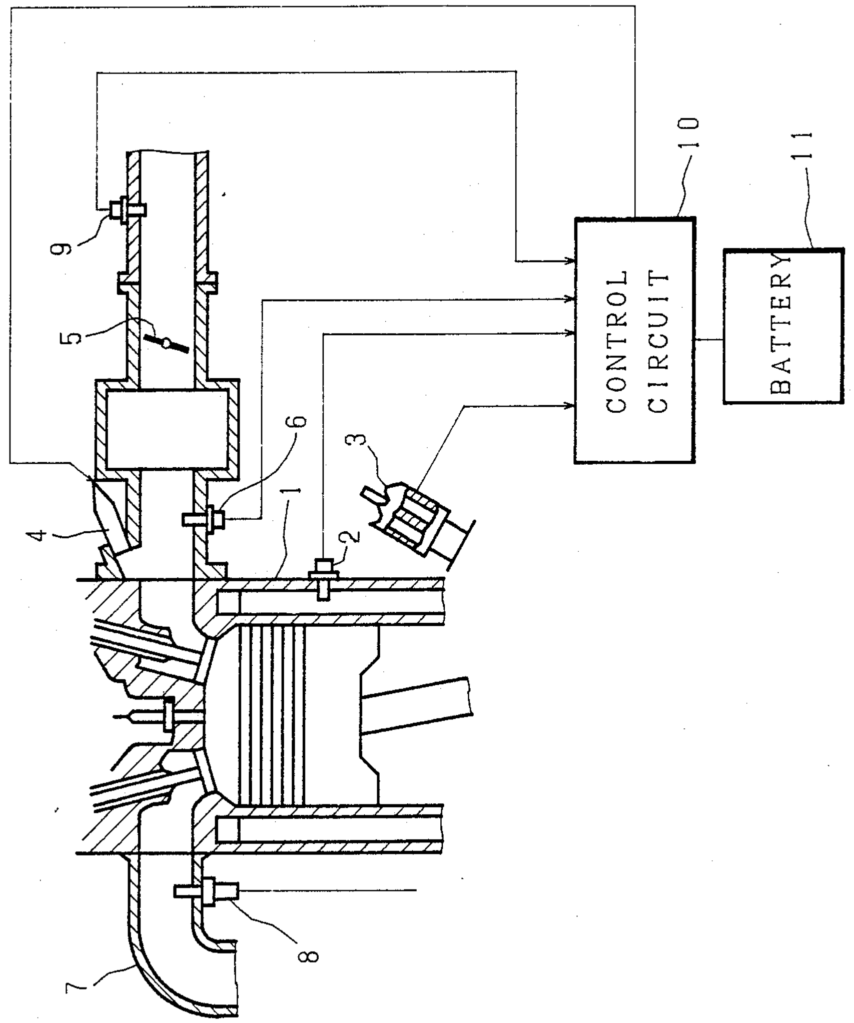
FIG. 2 is a schematic block diagram of the A/F ratio controller related to the invention.

The reference numeral 1 shown in FIG. 2 designates the engine. Radiated-water temperature sensor 2 detects temperature of radiated water. Crank-angle sensor 3 detects the number of the rotation of the engine 1. Fuel injector 4 feeds fuel to the engine 1. Throttle valve 5 adjusts the volume of air flowing through air-inlet tube. Pressure sensor 6 detects absolute pressure inside of the air-inlet system. The A/F ratio sensor 8 installed in the exhaust-gas tube 7 detects the A/F ratio by analyzing specific components present in the exhaust gas. The A/F ratio sensor 8 is provided with an oxygen-concentration detecting element and a heater which heats this element to a predetermined temperature value. Absorbed-air temperature sensor 9 detects temperature of the absorbed air. Control circuit 10 receives signals outputted from radiated-water temperature sensor 2, crankangle sensor 3, pressure sensor 6, A/F ratio sensor 8, and absorbed-air temperature, 9, to control operation of the fuel-injector 4. Substantially, the control circuit 10 is composed of a microcomputer. The reference numeral 11 designates a battery.

FIG. 2 designates a D-J format A/F ratio controller. The A/F ratio controller shown in FIG. 2 computes the basic injection pulse time on the bases of at least the value delivered from the pressure sensor 6 and the data, obtained from the crank angle sensor 3, designating the number of the rotation of the engine 1. The control circuit 10 executes corrections and transitory corrections of the computed values by referring to signals from the radiated-water temperature sensor 2 and the absorbed-air temperature sensor 9, while it also executes feedback correction of the computed values by applying the A/F ratio sensor 8, and. Finally, the control circuit 10 determines the fuel-injection pulse time.

Figure 3:
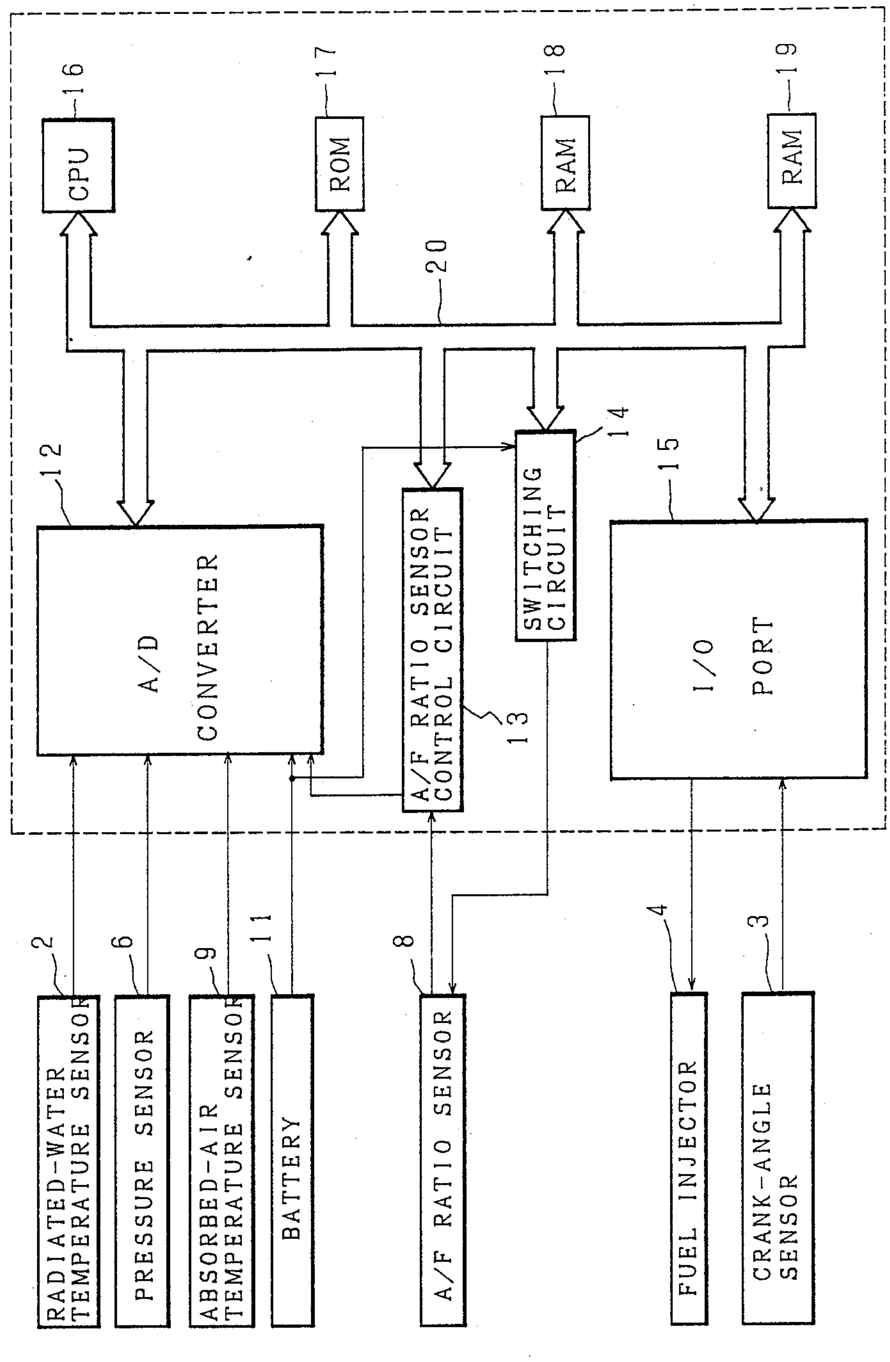
FIG. 3 is a schematic block diagram of the control circuit of the A/F ratio controller related to the invention.

FIG. 3 is a detailed block diagram of the control circuit 10. Central processing unit (CPU) 16 executes computations and operations for controlling the A/F ratio controller. ROM 17 stores programs. RAM 18 provisionally stores data. Power is constantly delivered to RAM 19 so that it can continuously retain data. Analog-digital (A/D) converter 12 converts the analog signal into a digital signal. The A/F ratio sensor control circuit 13 controls signals outputted from the A/F ratio sensor 8 in order that the sensor itself can output correct signals proportional to the actual A/F ratio.

The switching circuit 14 turns power supplied from the battery 11 ON and OFF. The power from the battery 11 is then delivered to the heater for heating the oxygen-concentration detecting element built in the A/F ratio sensor 8. I/O port 15 is the terminal which receives and outputs data. Bus 20 transfers data to and from respective elements of the control circuit 10. Signals outputted from the radiated-water temperature sensor 2, pressure sensor 6, battery 11, absorbed-air temperature sensor 9 via output terminals and signals outputted from the A/F ratio sensor 8 through A/F ratio sensor control circuit 13 are delivered to the A/D converter 12, and the A/F ratio sensor control circuit 13. Signals outputted from the crank-angle sensor 3 are delivered to I/O port 15. Fuel injector 4 receives a control signal from the CPU 16 via I/O port 15. The switching circuit 14 is controlled by the CPU 16.

Figure 4:
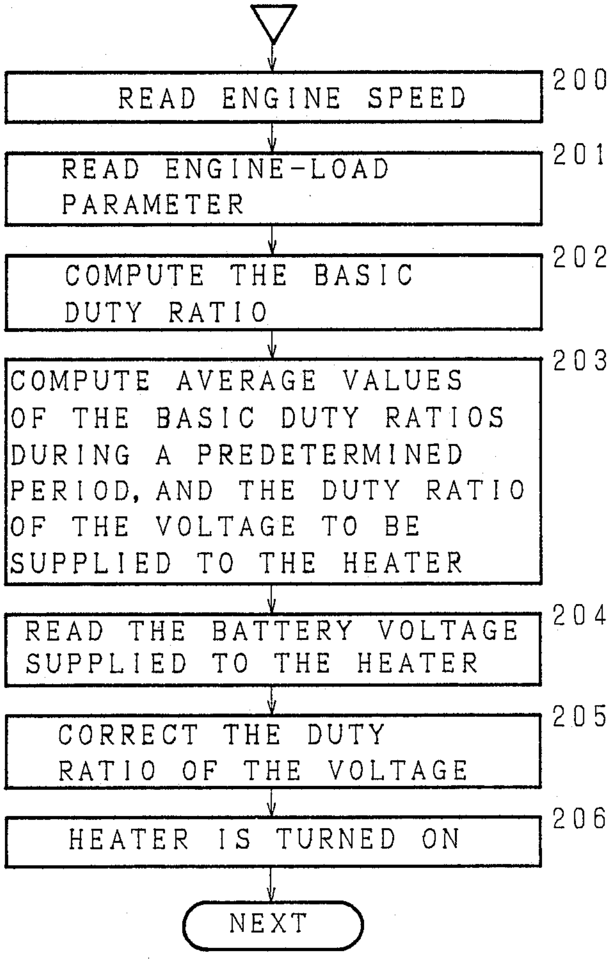
FIG. 4 is a flowchart designating the sequential procedure for executing control of the duty of the switching circuit related to the invention.
Figure 5:
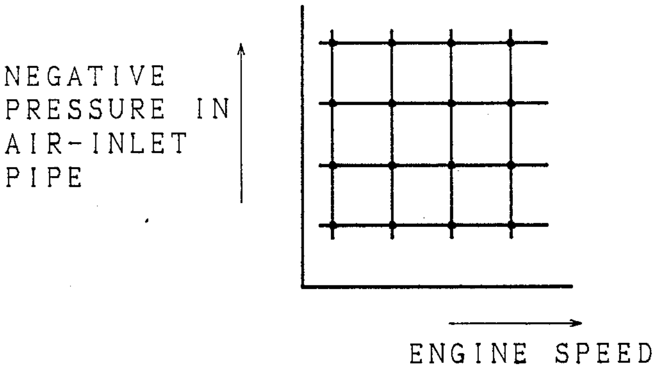
FIG. 5 is a conceptual diagram of a data map.
Figure 6:
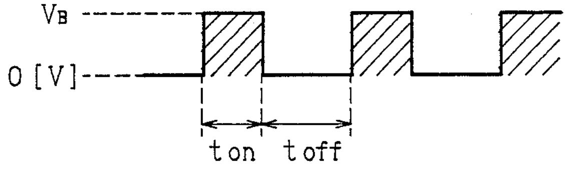
FIG. 6 is the waveform in relation to the control of the duty of a switching circuit of the invention.

FIG. 4 is the flowchart designating the sequential procedure of the duty control operation executed by the CPU 16 against the switching circuit 14. First, in step 200, the CPU 16 reads the number of the rotation of the engine 1 from the signal outputted by the crank-angle sensor 3. Next, in step 201, the CPU 16 reads the engine-load parameter composed of either the pressure inside of the air-inlet tube, or aperture degree of throttle, or the absorbed-air volume per a certain rotation of the engine 1. ROM 17 preliminarily stores a data map (shown in FIG. 5) designating the duty ratio according to the number of the rotation of the engine 1 and the load applied to the air-inlet tube. Next, in step 202, the CPU 16 reads the duty ratio according to the number of the rotation of the engine 1 an the load applied to the air-inlet tube already identified. The CPU 16 then computes the basic ratio, i.e., the ratio between time "$t_{on}$" needed for feeding power to the heater and time "$t_{off}$" designating the period to stop the power supply to the heater by executing interpolatory* computations (see FIG. 6). The reference character $V_B$ designates the power voltage of the battery 11. Next, in step 203, the CPU 16 computes the average value of the basic duty ratio which is computed every specific period of time (where the average value covers a period from a predetermined moment up to the present), and then, the CPU 16 coverts the computed average value into the duty ratio for driving the heater. However, even though the duty ratio remains constant, if the battery voltage $V_B$ varies, the power level supplied to the heater also varies itself. To securely read this, when step 204 is underway, the CPU 16 reads the actual level of the battery voltage $V_B$. Then, in step 205, the CPU 16 corrects the duty ration according to the value of the battery voltage $V_B$. Next, in step 206, the CPU 16 drives the switching circuit 14 in order that the duty ratio can be the corrected one and the power supply to the heater can be turned ON and OFF.

Figure 7:
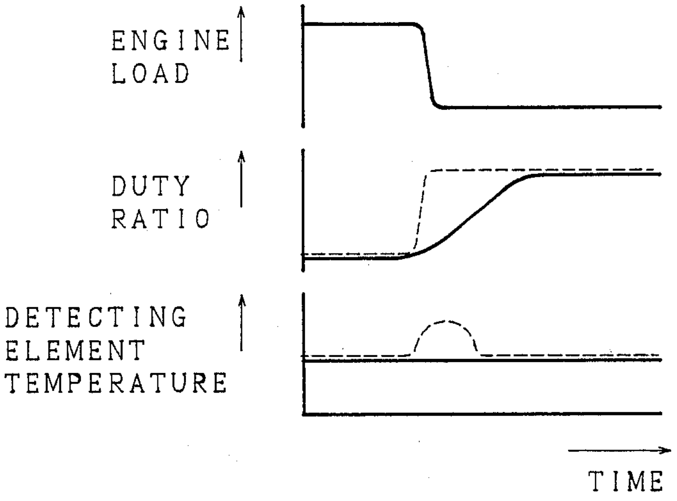
FIG. 7 is a graphical chart designating the duty ratio against variation of the engine load and the temperature characteristic of the oxygen-concentration detecting element related to the invention.

FIG. 7 is the graphical chart designating the variation of the duty ratio and the variation of the temperature of oxygen-concentration detecting element when the engine load varies. The broken line of FIG. 7 designates the computed basic duty ratio and the variation of temperature of the oxygen-concentration detecting element when control operation is executed in accordance with the basic duty ration. The temperature of the oxygen-concentration detecting element does not remain constant. On the other hand, since the preferred embodiment of the invention executes the control operation on the basis of the average value of the computed duty ratio as shown by the solid line of FIG. 7, the oxygen-concentration detecting element can maintain a constant temperature.

Figure 8:
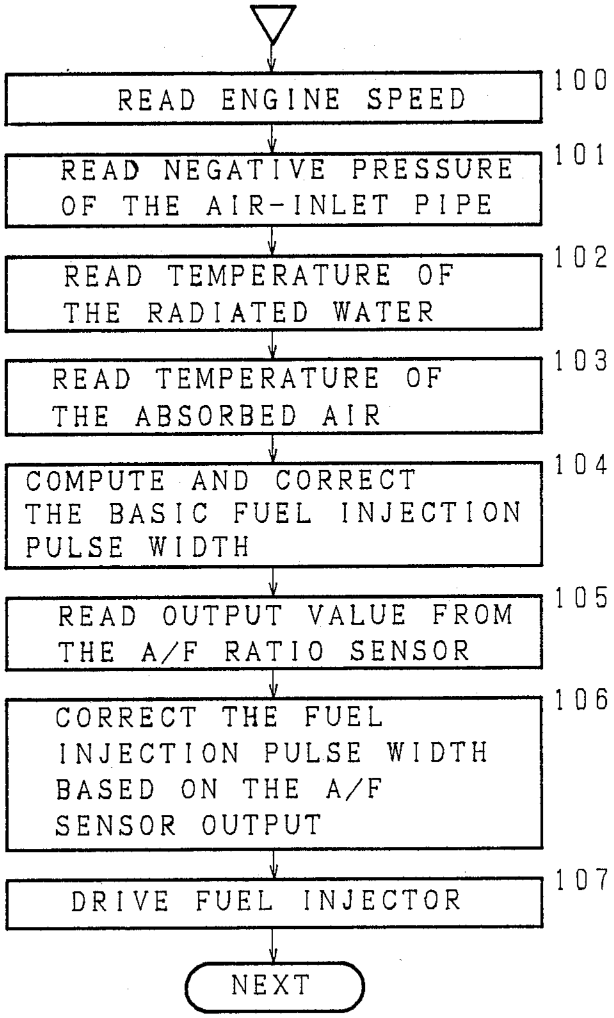
FIG. 8 is a flowchart designating the sequential procedure for the control of the A/F ratio related to the invention.

FIG. 8 is a flowchart designating the sequential procedure of the A/F ratio control operation to be executed in accordance with programs stored in ROM 17. First, in step 100, the CPU 16 reads the number of the rotation of the engine 1 from the signal outputted from the crank-angle sensor 3. Next, in step 101, the CPU 16 reads the pressure inside of the air-inlet tube from the signal outputted from the pressure sensor 6. Next, in step 102, the CPU 16 reads temperature of radiated water from the signal outputted from the radiatedwater* temperature sensor 2. In step 103, the CPU 16 reads the temperature of absorbed air the from signal outputted from the absorbed-air temperature sensor 9. Next, in step 104, the CPU 16 computes the basic fuel injection pulse width on the basis of the number of the rotation of the engine 1 and pressure inside of the air-inlet tube. The CPU 16 then corrects the pulse width by checking the radiated-water temperature and the absorbed-air temperature. Next, in step 105, the CPU 16 reads the signal outputted from the A/F ratio sensor 8. Next, in step 106, the CPU 16 corrects the fuel injection pulse width on the basis of the deviation between the objective A/F ratio and the actual A/F ratio. Finally, in step 107, the CPU 16 drives fuel injector 4 by applying the corrected fuel injection pulse width.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An air-fuel (A/F) ratio controller of an internal combustion engine comprising;

an A/F ratio sensor which is composed of the following; an oxygen-concentration detecting element for generating electric signals responsive to the oxygen concentration of the exhaust gas of said engine, and a heater which heats said oxygen-concentration detecting element to a predetermined temperature;

a controller for executing feedback control of quantity of fuel to be supplied to said engine in accordance with electric signals generated by said oxygen-concentration detecting means so that the A/F ratio of fuel-mixed vapor to be supplied to said engine can be a predetermined A/F ratio;

engine-speed detection means for detecting periodically the speed of said engine;

engine-load detection means for detecting periodically load applied to said engine;

duty-ratio computing means for computing duty ratio of the voltage to be supplied to said heater on the basis of the relation between the detected speed of said engine and load applied thereto;

average-value computing means for computing average value of a plurality of duty rations computed during a period from a predetermined moment up to the present; and heater-driving means for driving said heater on the basis of the duty ratio of said average value.

2. An A/F ratio controller of an internal combustion engine as set forth in claim 1, wherein said engine-load detection means comprises an air-inlet pressure detector.

3. An A/F ratio controller of an internal combustion engine as set forth in claim 1, wherein said engine-load detection means comprises a throttle valve aperture-degree detector.

4. An A/F ratio controller of an internal combustion engine as set forth in claim 1, wherein said engine-load detection means comprises an air-flow sensor for detecting quantity of absorbed air per a certain rotation of said engine.

5. An A/F ratio controller of an internal combustion engine as set forth in claim 1, wherein said duty-ratio computing means computes a duty ratio corresponding to at least one of rotational speed of said engine and engine load by applying interpolation, on the basis of the degree of the increase or decrease of duty ratios predetermined by the relation between the speed of said engine and the load applied to said engine.

6. An A/F ratio controller of an internal combustion engine comprising;

an A/F ratio sensor which is composed of the following; an oxygen-concentration detecting element for generating electric signals responsive to the oxygen concentration of the exhaust gas of said engine, and a heater for heating said oxygen-concentration detecting element to a predetermined temperature;

a controller for executing feedback control of quantity of fuel to be supplied to said engine in accordance with electric signals generated by said oxygen-concentration detecting means so that the A/F ratio of fuel-mixed vapor to be supplied to said engine can be a predetermined A/F ratio;

engine-speed detection means for detecting periodically the speed of said engine;

engine-load detection mean* for detecting periodically load applied to said engine;

duty-ratio computing means for computing duty ratio of the voltage to be supplied to said heater on the basis of the relation between the detected speed of said engine and load applied thereto;

average-value computing means for computing average value of a plurality of duty ratios computed during a period from a predetermined moment up to the present; and heater-driving means for driving said heater on the basis of the duty ratio obtained by correcting said average value according to the supply voltage to be supplied to said heater.

7. An A/F ratio controller of an internal combustion engine as set forth in claim 6, wherein said engine-load detection means comprises an air-inlet pressure detector.

8. An A/F ratio controller of an internal combustion engine as set forth in claim 6, wherein said engine-load detection means comprises a throttle valve aperture-degree detector.

9. An A/F ratio controller of an internal combustion engine as set forth in claim 6, wherein said engine-load detection means comprises an air-flow sensor for detecting quantity of absorbed air per one speed cycle of said engine.

10. An A/F ratio controller of an internal combustion engine as set forth in claim 6, wherein said duty-ratio detection means computes a duty ratio corresponding to at least one of rotational speed of said engine and engine load by applying interpolation on the basis of the degree of the increase or decrease of duty ratios predetermined by the relation between the speed of said engine and the load applied to said engine.

* * * * *